Oct. 8, 1963 R. M. COGAN 3,106,114
ROLL-EXTRUDING MACHINE
Filed June 26, 1959
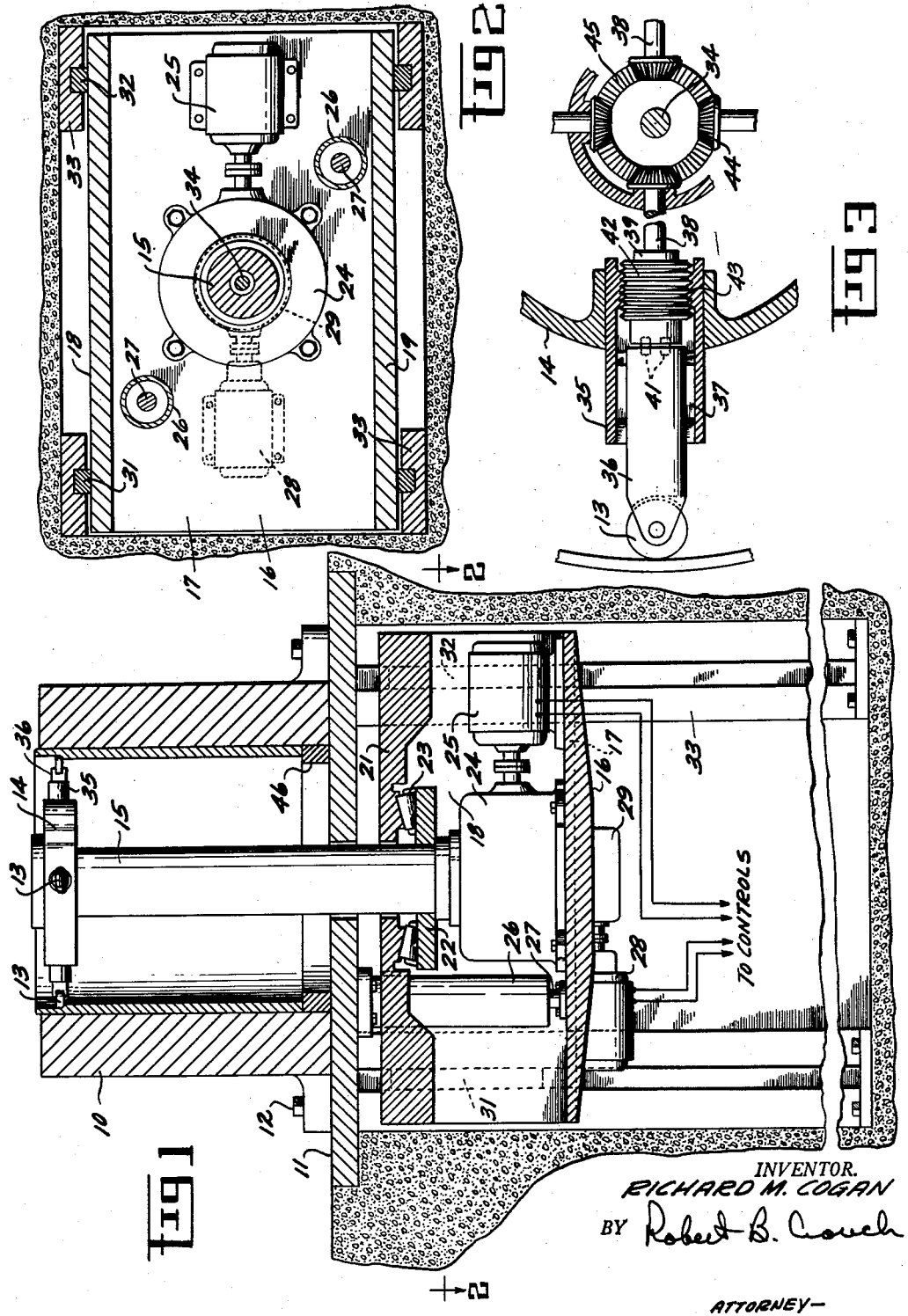
INVENTOR.
RICHARD M. COGAN
BY Robert B. Crouch
ATTORNEY United States Patent Office
3,106,114
Patented Oct. 8, 1963

3,106,114
ROLL-EXTRUDING MACHINE
Richard M. Cogan, Cincinnati, Ohio, assignor to General
Electric Company, a corporation of New York
Filed June 26, 1959, Ser. No. 823,157
6 Claims. (Cl. 80—12)

The present invention relates to a machine for roll-extruding large-diameter seamless tubes from thick walled cylindrical workpieces.

Conventional machines for the manufacture of large diameter (24 inches or more) seamless tubes have generally been of (1) the stock-removal type which employ a cutting tool, (2) the roll forming type which employ a rotating internal mandrel, or (3) a combination of both types. In roll forming machines that employ a rotating mandrel, the thrust bearings are of necessity large, heavy and expensive since they are required to bear the weight of the mandrel in addition to the load applied by the machine. In large machines of this type, it is not uncommon that the mandrel weight exceeds the load applied by the machine. In addition, a rotating mandrel is expensive and difficult to manufacture. This derives from the fact that the mandrel must be precisely balanced to prevent any eccentric loading which could create destructive vibrations when it is rotated. An internal mandrel creates a further problem, in that material roll-formed on an internal mandrel tends to "ring roll," i.e., enlarge in diameter as its thickness is reduced, thus growing away from the mandrel. This makes it very difficult to hold tolerances on diameters and results in a high scrap rate. Also, machines employing an internal rotating mandrel require a support for the extruded section so that it will rotate about an extension of the mandrel axis. In machining operations, such as with a lathe, a tail-stock is required to support one end of the workpiece. The location of the tail-stock determines the size or capacity of the machine and limits the length of tubes which can be manufactured on a given machine. Furthermore, machining operations are not economically attractive for manufacturing large diameter tubes because of their poor material utilization rates.

An object of the present invention is to provide a practical and economical machine to manufacture large-diameter seamless tubes.

The present invention comprehends an improved machine for the manufacture of large-diameter seamless tubes by extrusion of material from a thick walled cylindrical workpiece in a vertical direction. This invention employs an external mandrel which is fixed in a vertical position. The mandrel encases the entire workpiece and extends over the full circumference and height thereof. A circular series of rolls is mounted concentrically within the mandrel for rotation about the mandrel axis. The rolls themselves are supported in close proximity to the inner surface of the mandrel. Means is provided for rotating the series of rolls in a horizontal plane about the axis of the mandrel, and other means is provided for moving the series of rolls vertically along the axis of the mandrel at a controlled rate of speed. By the combined movements of the rolls, the material of the workpiece is extruded through the space between the rolls and the mandrel.

Other objects and many of the intended advantages of this invention will be readily appreciated as the same becomes understood by reference to the following detailed description when considered in connection with the accompanying drawings wherein:

FIG. 1 is an elevation view partly in section of a machine according to the present invention.

FIG. 2 is a sectional view taken along lines A—A of FIG. 1.

FIG. 3 is a plan view partly in section and at an enlarged scale, showing a portion of the roll fixture of FIG. 1.

Referring to FIG. 1, a fixed cylindrical mandrel is illustrated at 10 and is positioned vertically on a rigid support 11 and secured thereto by detachable means, such as the bolts 12. In practice the support 11 may be a section of reinforced flooring which bridges a pit located beneath the mandrel. A plurality of rolls 13 are mounted within the mandrel 10 in a head or fixture 14 which is in turn mounted on a drive shaft 15 for rotation in a horizontal plane about the longitudinal axis of the mandrel. The shaft 15 extends through support 11 and is connected to a box-like carriage 16 which is located within the aforementioned pit and adapted for vertical movement therein. The carriage itself is generally rectangular in form and includes a base 17, side members 18 and 19 and an upper yoke 21. A radially extending collar 22 on the lower end of the shaft 15 carries an annular series of thrust bearings 23 which bear against the lower surface of the yoke element 21. A gearbox 24 is mounted on the upper surface of the base 17 of the carriage and is connected to the lower extremity of the shaft 15 below collar 22. A motor 25 is similarly mounted on the base 17 and is drivingly connected through the gearbox 24 to the shaft 15. At least two hydraulic cylinders 26 are mounted on the lower surface of rigid support 11 and extend through the yoke element 21 toward the base 17. A piston rod 27 protrudes from the free end of each cylinder 26 and is secured to the base. Hydraulic fluid is supplied simultaneously to both cylinders from a source (not shown) to control vertical movement of the carriage. A second motor 28 and gearbox 29 are carried on the lower surface of the base 17. Vertically aligned guides 31 and 32 are carried by the side members 18 and 19 at each end thereof. Vertical guideways 33 are mounted rigidly within the pit to receive guides 31 and 32 and ensure uniform movement of the carriage in a vertical plane. As shown in FIG. 2, an intermediate shaft 34 is concentrically positioned within shaft 15 and is connected to gearbox 29, such that rotational motion from motor 28 is transmitted through gearbox 29 to the shaft 34.

The mechanical details of fixture 14 are illustrated in FIG. 3. A plurality of cylindrical sleeves 35 are secured in fixture 14 and extend radially toward the mandrel. Each roll 13 is mounted for rotation in one end of an elongated retainer 36 which is telescoped within one of the cylindrical sleeves 35. Each retainer is splined, as at 37, to its sleeve to permit relative axial movement between the two. A plurality of shafts 38 are provided, each having a cylindrical extension 39 which is received within a sleeve 35 and is connected to its associated retainer 36 through an annular series of ball-bearings 41. Each cylindrical extension 39 is provided with external threads 42 which mesh with internal threads 43 on the interior surface of the sleeve 35. A bevel gear 44 is secured to each shaft 38 at the end removed from extension 39. Each gear 44 meshes with another bevel gear 45 on the upper end of the intershaft 34. By this arrangement, rotational motion of shaft 34 is translated into reciprocal movement of retainers 36 and rolls 13.

In the operation of the present invention, a workpiece in the form of a ring forging is positioned within the mandrel 10. The lower end of the workpiece is maintained above the level of the rigid support 11 by means of an annular spacer 46. Since fixture 14 will bottom against support 11, spacer 46 permits the full height of the workpiece to be worked by the rolls. The rolls 13 are positioned a desired distance from the mandrel by activating motor 28. This is accomplished by motor 28 driving through gearbox 29 and shafts 34 and 38 to position retainers 36 within sleeves 35. Motor 25 is then activated to rotate shaft 15 and fixture 14, causing rolls 13 to traverse the workpiece in a horizontal plane. Shafts 15 and 34 are both rotated at the same rate during operation of the machine to maintain rolls 13 in position relative to the mandrel. Hydraulic fluid is supplied to the upper end of cylinders 26, forcing carriage 16 downwardly at a desired rate. The downward movement of the carriage is transmitted through yoke 21 and bearings 23 to collar 22, thus putting shaft 15 in tension and drawing fixture 14 downwardly within the mandrel 11. The combined rotational and axial movement of the fixture causes the material of the workpiece to be extruded through the space between the rollers and the inner surface of the mandrel. Since the material is extruded from the mandrel without rotation, the part formed can be inspected for tolerances and dimensions while it is being made.

With the present invention a ring forging can be roll-extruded cold, thus resulting in approximately a 25% increase in the strength of the ultimate part formed. Sufficient force must be applied to the rolls 13 to cause plasticity of the material of the workpiece since the material must be worked within the plasticity range, i.e., between the yield point and the point of ultimate strength, of the material.

The machine of the present invention in no way limits the diameter of a tubular part that can be made. The primary structural member of the present machine is the center drive shaft 15 and there are no outside structural members other than the mandrel itself. Since the mandrel and the roll fixture can be easily replaced with others of a different diameter, the basic machine diameter has no practical limitation. Also, since there is no tailstock, the machine does not limit the length of part to be made. This machine also permits considerably more rigidity at a lower cost than conventional equipment, since the center drive shaft takes the tensile loading, while the workpiece and roll fixture are in compression.

Since the mandrel of the present machine is fixed, there is no requirement that it be balanced. Accordingly, the mandrel can be made in an unconventional and economical manner, such as by casting a reinforced concrete backing member around a cylindrical steel insert. To eliminate drag between the extruded section of the part being formed and the mandrel, the inner surface of the mandrel is made convergent or conical in a downward direction by approximately .0005 inch/foot of mandrel height.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim is:

1. A machine for roll-extruding a large-diameter, seamless tube from a thick-walled cylindrical workpiece, comprising:

a fixed mandrel secured in vertical position on a rigid support, the mandrel having a generally cylindrical inner surface adapted to encase a workpiece;

a series of rolls mounted within the mandrel in concentric relationship therewith, the rolls being positioned in closely spaced relation within the inner surface of the mandrel;

rotational motion means operatively connected to the rolls for rotating them about the axis of the mandrel;

restraining means to receive an end of the thick-walled cylindrical workpiece nearest the rigid support to restrain movement of the workpiece axially of the mandrel toward the rigid support;

and axial motion means connected to the rolls for moving them axially of the mandrel;

the combined movements of the rolls, the mandrel and the restraining means acting to extrude the material of the workpiece through the space between the rolls and the mandrel in a direction opposite to that of the movement of the rolls axially of the mandrel when the axial motion means moves the rolls toward the restraining means.

2. A machine for roll-extruding from a thick-walled cylindrical workpiece a large-diameter, seamless tube of length greater than that of a mandrel comprising:

a fixed mandrel secured in vertical position on a rigid support, the mandrel having a generally cylindrical inner surface adapted to encase a workpiece;

a series of rolls mounted within the mandrel in concentric relationship therewith, the rolls being positioned in closely spaced relationship with the inner surface of the mandrel;

rotational motion means operatively connected to the rolls for rotating them about the axis of the mandrel;

an annular spacer mounted within the mandrel at the rigid support to receive an end of the thick-walled cylindrical workpiece nearest the rigid support to restrain movement of the workpiece axially of the mandrel toward the rigid support;

and axial motion means connected to the rolls for moving them axially of the mandrel;

the combined movements of the rolls, the mandrel and the annular spacer acting to extrude the material of the workpiece through the space between the rolls and the mandrel in a direction opposite to that of the movement of the rolls axially of the mandrel when the axial motion means moves the rolls toward the annular spacer.

3. A machine for roll-extruding from a thick-walled cylindrical workpiece a large-diameter, seamless tube of length greater than that of a mandrel comprising:

a fixed mandrel secured in vertical position on a rigid support, the mandrel having a generally cylindrical inner surface adapted to encase a workpiece;

a fixture mounted within the mandrel and carrying at least three rolls, the rolls being positioned in close relation to the inner surface of the mandrel at spaced points about the circumference thereof;

a shaft secured to the fixture and extending concentrically within the mandrel through the rigid support;

rotational motion means connected to the shaft for rotating the fixture and rolls about the axis of the mandrel and located on the side of the rigid support opposite to that to which the mandrel is secured;

an annular spacer mounted within the mandrel at the rigid support to receive an end of the thick-walled cylindrical workpiece nearest the rigid support to restrain movement of the workpiece axially of the mandrel toward the rigid support;

and axial motion means operatively connected to the shaft for moving the fixture and rolls axially of the mandrel;

the combined movements of the rolls, the mandrel and the annular spacer acting to extrude the material of the workpiece through the space between the rolls and the mandrel in a direction opposite to that of the movement of the rolls axially of the mandrel when the axial motion means moves the rolls toward the annular spacer.

4. A machine for roll-extruding from a thick-walled cylindrical workpiece a large-diameter, seamless tube of length greater than that of the mandrel comprising:

a fixed mandrel secured in vertical position on a rigid support, the mandrel having a generally cylindrical inner surface adapted to encase a workpiece;

a fixture mounted within the mandrel and carrying at least three rolls, the rolls being positioned in close relation to the inner surface of the mandrel at spaced points about the circumference thereof;

a shaft secured to the fixture and extending concentrically within the mandrel through the rigid support;

rotational motion means connected to the shaft for rotating the fixture and rolls about the axis of the mandrel and located on the side of the rigid support opposite that to which the mandrel is secured;

an annular spacer mounted within the mandrel at the rigid support to receive an end of the thick-walled cylindrical workpiece nearest the rigid support to restrain movement of the workpiece axially of the mandrel toward the rigid support;

axial motion means operatively connected to the shaft for moving the fixture and rolls axially of the mandrel;

and roll adjusting means operatively connected to the rolls for adjusting their position relative to the mandrel, and including a motion activating means located on the side of the rigid support opposite to that to which the mandrel is secured;

the combined movements of the rolls, the mandrel and the annular spacer acting to extrude the material of the workpiece through the space between the rolls and the mandrel in a direction opposite to that of the movement of the rolls axially of the mandrel when the axial motion means moves the rolls toward the annular spacer.

5. A machine for roll-extruding from a thick-walled cylindrical workpiece a large-diameter, seamless tube of length greater than that of the mandrel comprising:

a fixed mandrel secured in vertical position on a rigid support, the mandrel having a generally cylindrical inner surface adapted to encase a workpiece;

a fixture mounted within the mandrel and carrying at least three rolls, the rolls being positioned in close relation to the inner surface of the mandrel at spaced points about the circumference thereof;

a pair of concentric shafts extending longitudinally of the mandrel along the central axis thereof, one of said shafts being connected to the fixture and the other shaft being operatively connected to the rolls, both of said shafts extending through the rigid support;

first rotational motion means connected to the shaft which is connected to the fixture for rotating the fixture and rolls about the axis of the mandrel and located on the side of the rigid support opposite to that to which the mandrel is secured;

second rotational motion means connected to the shaft which is connected to the rolls for adjusting the position of the rolls with relation to the inner surface of the mandrel, the activation portion of the second rotational means being located on the side of the rigid support opposite to that to which the mandrel is secured;

an annular spacer mounted within the mandrel at the rigid support to receive an end of the thick-walled cylindrical workpiece nearest the rigid support to restrain movement of the workpiece axially of the mandrel toward the rigid support;

axial motion means operatively connected to the shaft for moving the fixture and rolls axially of the mandrel;

and roll adjusting means operatively connected to the rolls for adjusting their position relative to the mandrel, and including a motion activating means located on the side of the rigid support opposite to that to which the mandrel is secured;

the combined movements of the rolls, the mandrel and the annular spacer acting to extrude the material of the workpiece through the space between the rolls and the mandrel in a direction opposite to that of the movement of the rolls axially of the mandrel when the axial motion means moves the rolls toward the annular spacer.

6. A machine for roll-extruding from a thick-walled cylindrical workpiece a large-diameter, seamless tube of length greater than that of the mandrel comprising:

a fixed mandrel secured in vertical position on a rigid support, the mandrel having a generally cylindrical inner surface adapted to encase a workpiece;

a fixture mounted within the mandrel and carrying at least three rolls, the rolls being positioned in close relation to the inner surface of the mandrel at spaced points about the circumference thereof;

a shaft secured at one end to the fixture and extending concentrically within the mandrel through the rigid support;

a box-like carriage secured to the other end of the shaft on the side of the rigid support opposite to that to which the mandrel is secured;

rotational motion means mounted on said carriage and connected to the shaft for rotating the fixture and the rolls about the axis of the mandrel;

an annular spacer mounted within the mandrel at the rigid support to receive an end of the thick-walled cylindrical workpiece nearest the rigid support to restrain movement of the workpiece axially of the mandrel toward the rigid support;

axial motion means connected to the carriage to impart vertical movement thereto thereby moving the fixture and the rolls axially of the mandrel;

and roll adjusting means operatively connected to the rolls for adjusting their position relative to the mandrel and including motion activating means mounted on the carriage;

the combined movements of the rolls, the mandrel and the annular spacer acting to extrude the material of the workpiece through the space between the rolls and the mandrel in a direction opposite so that of the movement of the rolls axially of the mandrel when the axial motion means moves the rolls toward the annular spacer.

References Cited in the file of this patent

UNITED STATES PATENTS

| 932,168 | Parker | Aug. 24, 1909 |
| 1,353,227 | Frank | Sept. 21, 1920 |
| 1,528,832 | Kellogg | Mar. 10, 1925 |
| 1,794,797 | Rockwell | Mar. 3, 1931 |
| 2,529,753 | Williams | Nov. 14, 1950 |